Aug. 11, 1959     J. G. BRYANT     2,898,921
CORN SHELLER HAVING AN ASPIRATOR CONDUIT
Filed March 16, 1956     4 Sheets-Sheet 1
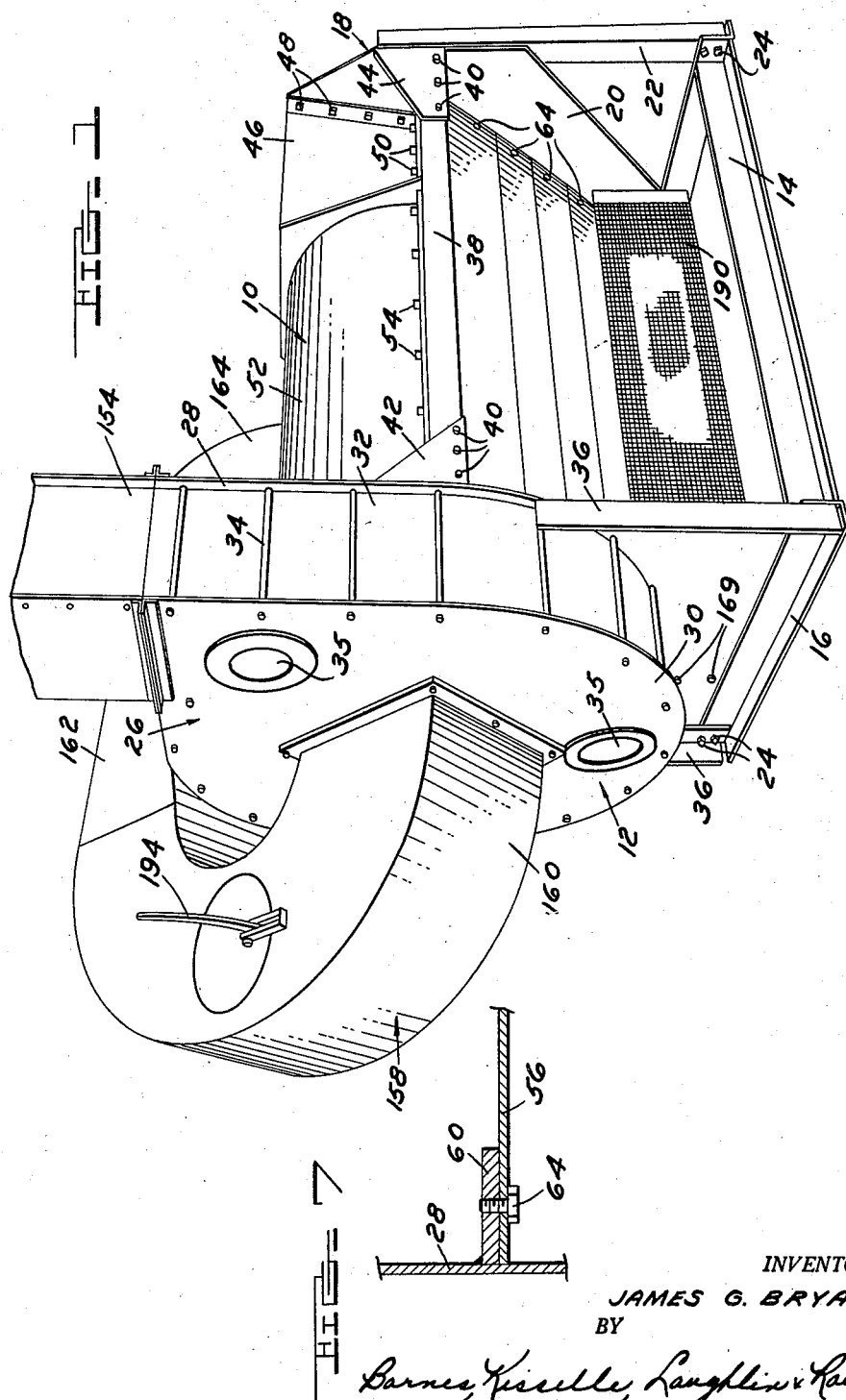
INVENTOR.
JAMES G. BRYANT
BY
ATTORNEYS Aug. 11, 1959     J. G. BRYANT     2,898,921
CORN SHELLER HAVING AN ASPIRATOR CONDUIT
Filed March 16, 1956     4 Sheets-Sheet 2
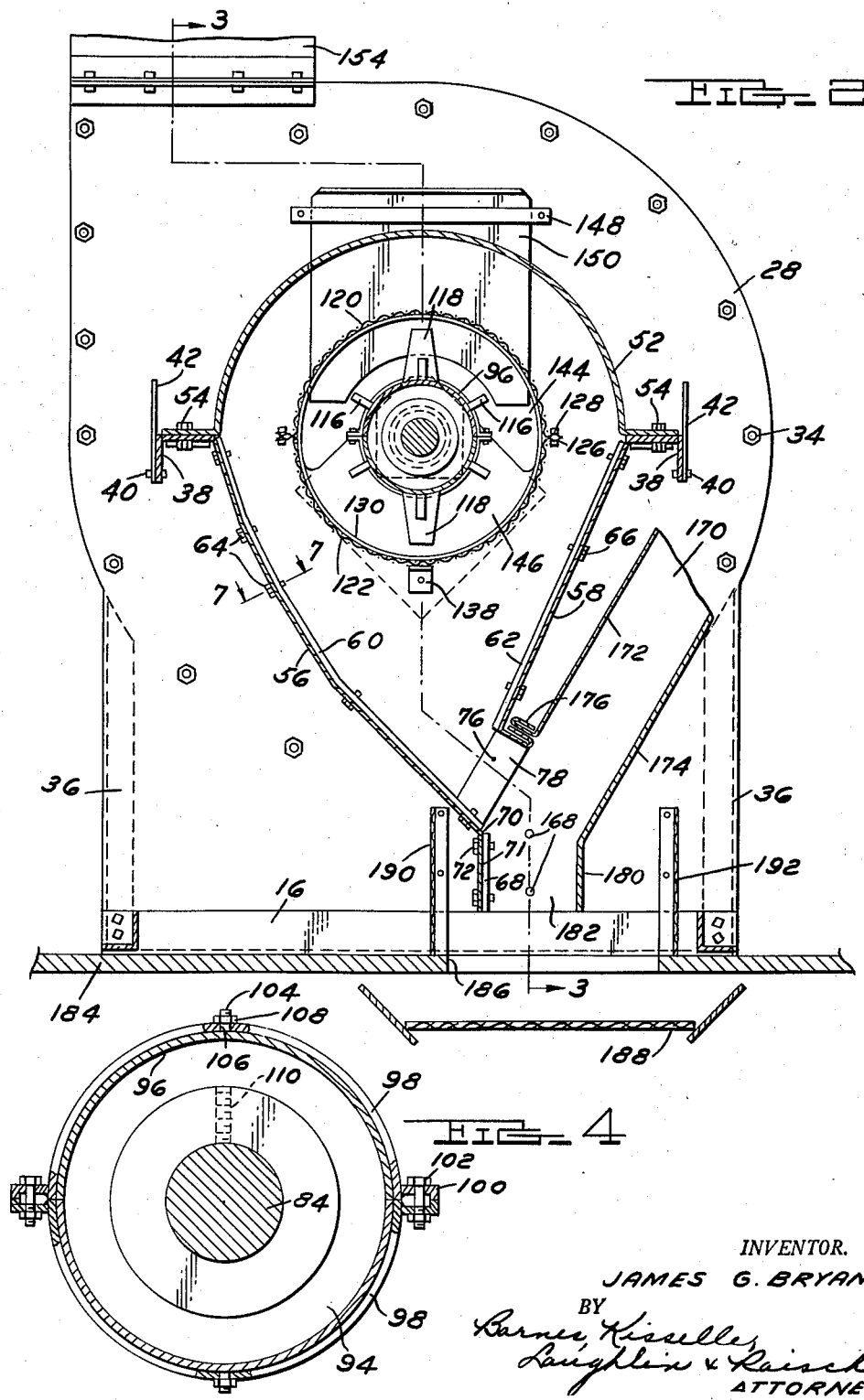
INVENTOR.
JAMES G. BRYANT
BY
ATTORNEYS

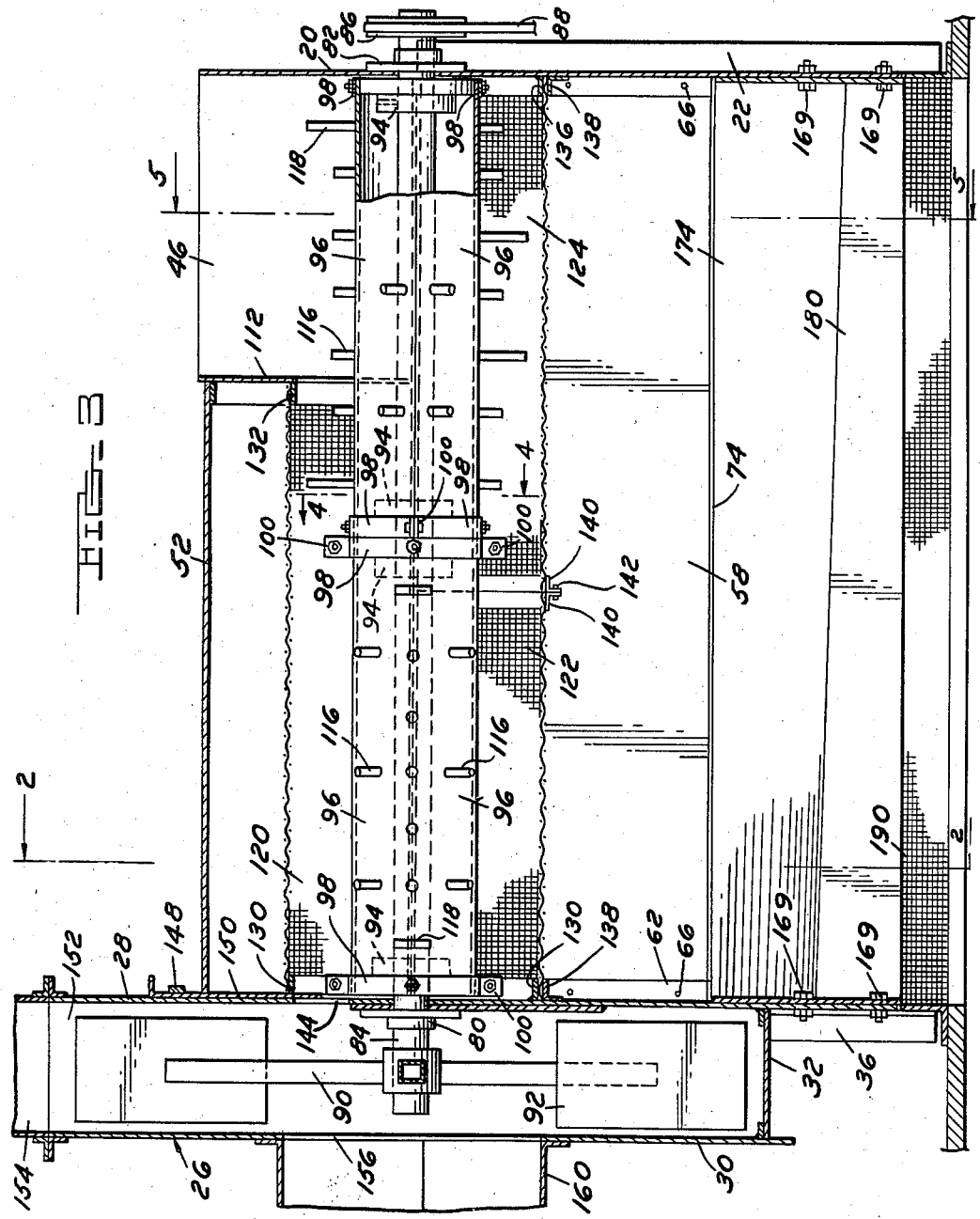

Aug. 11, 1959  J. G. BRYANT  2,898,921
CORN SHELLER HAVING AN ASPIRATOR CONDUIT
Filed March 16, 1956  4 Sheets-Sheet 4

INVENTOR.
JAMES G. BRYANT
BY
ATTORNEYS

United States Patent Office 2,898,921
Patented Aug. 11, 1959

2,898,921

CORN SHELLER HAVING AN ASPIRATOR CONDUIT

James G. Bryant, Port Huron, Mich.

Application March 16, 1956, Serial No. 572,066

11 Claims. (Cl. 130—6)

This invention relates to a machine for shelling corn.

It is an object of the present invention to provide a corn sheller of novel construction which incorporates means for economically and efficiently separating the kernels of corn from other foreign materials such as husks, pieces of cobs, dirt, etc.

A further object of the invention resides in the provision of a corn shelling machine which is of relatively large capacity in relation to its size.

Another object of the invention lies in the provision of a machine structure for a corn sheller which is in the form of different basic components which are bolted together and which may be dismantled and replaced with others to change the size or capacity of the machine.

In the drawings:

Fig. 1 is a perspective view of the corn shelling machine of this invention.

Fig. 2 is a cross sectional view of the machine taken generally along the lines 2—2 in Fig. 3.

Fig. 3 is a longitudinal vertical sectional view taken generally along the lines 3—3 in Fig. 2.

Fig. 4 is a sectional view on an enlarged scale through the corn shelling cylinder and taken generally along the lines 4—4 in Fig. 3.

Fig. 7 is a sectional view on an enlarged scale along the line 7—7 in Fig. 2.

Figure 5:
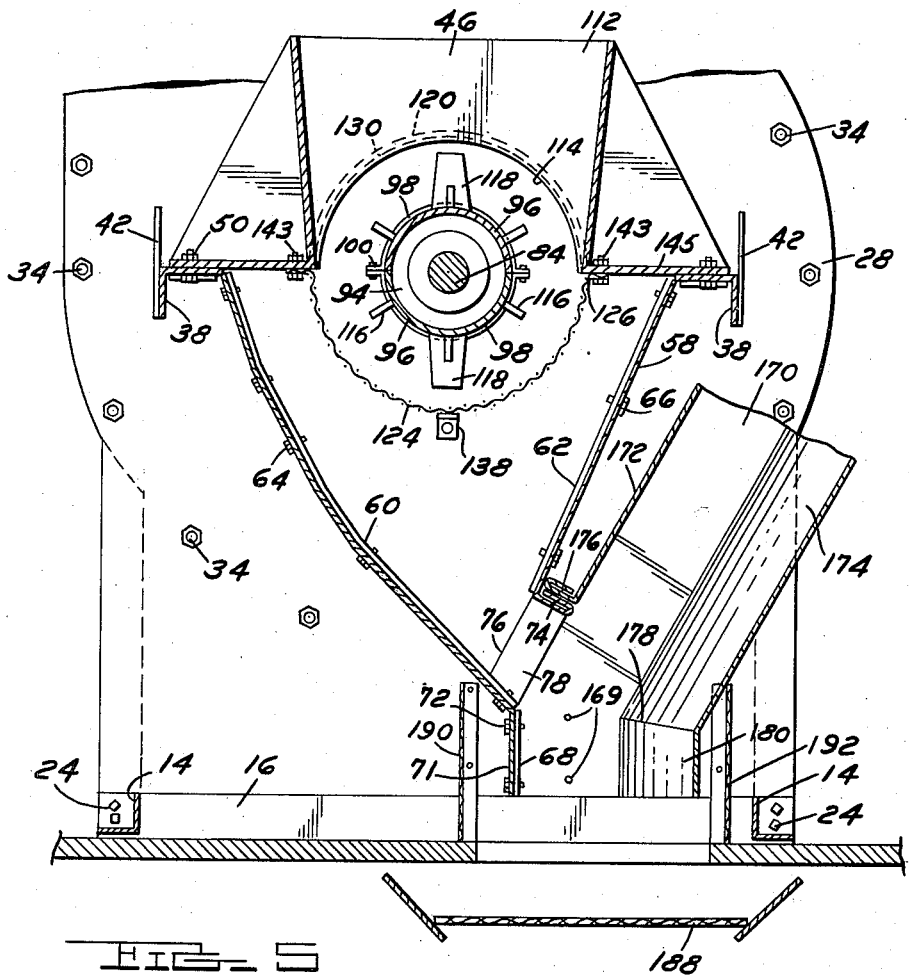
Fig. 5 is a sectional view through the hopper of the machine and taken generally along the lines 5—5 in Fig. 3.
Figure 6:
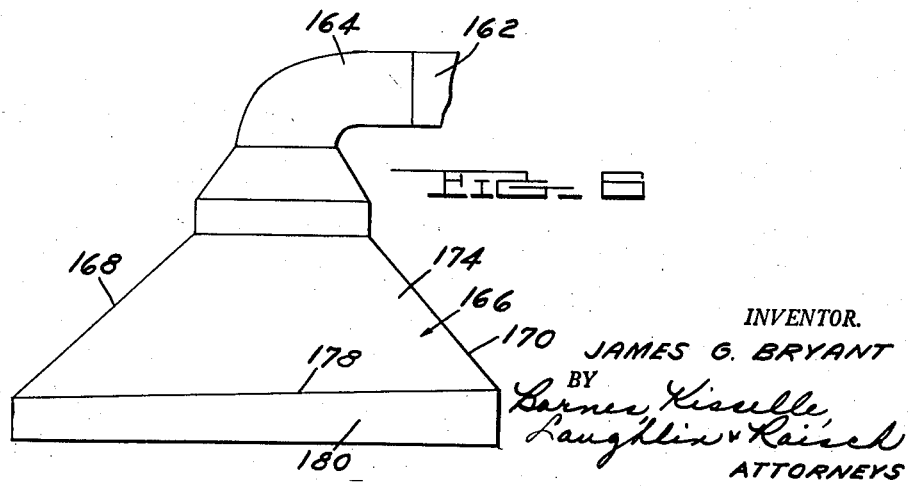
Fig. 6 is a rear view of the aspirator casing and a portion of the suction pipe of the machine.

Referring first to Fig. 1, the machine generally includes a housing section 10 and a blower section 12. These two sections are supported on an angle iron base comprising longitudinally extending angles 14 having transversely extending angles 16 welded to the opposite ends thereof. At one end of the machine, housing section 10 is supported on an end frame 18 comprising a plate 20 having upright legs 22 welded thereto. Frame 18 is connected with the angle iron base formed by members 14 and 16 by bolts 24. Blower section 12 comprises a blower housing 26 having side walls 28 and 30 between which is wrapped a peripheral wall 32, these walls being held in assembled relation by means of bolts 34. Side wall 28 of housing 26 extends downwardly to base angle 16 and has upright legs 36 welded thereto. Legs 36, as is the case with legs 22, are connected at their lower ends to the base of the machine by the bolts 24. The other side wall 30 of the machine is fashioned with access openings provided with removable covers 35.

Housing section 10 of the machine includes a pair of horizontal angle iron stringers 38 which are supported at each end by means of bolts 40 passing through stringers 38 and gusset plates 42 and 44 welded to the side wall 28 and plate 20, respectively. Adjacent the end frame 18, there is mounted on stringers 38 a hopper 46. Hopper 46 is in the form of a weldment which is bolted to plate 20 as at 48 and to stringers 38 as at 50. Between hopper 46 and wall 28 of blower housing 26, there is arranged a semi-cylindrical cover 52 having flanged ends bolted to stringers 38 as at 54.

Referring now to Fig. 2, it will be observed that below stringers 38, the housing section 10 is provided with a front wall 56 and a rear wall 58. In order to mount these walls on the machine, the side wall 28 of blower housing 26 and the plate 20 at the opposite end of the machine have straps 60 and 62 welded to the inner faces thereof. These straps, as is shown in Fig. 2, incline downwardly towards each other; and the walls 56 and 58 are bolted thereto as at 64 and 66. At the lower end of straps 60, there is welded to the end plate 20 and the side wall 28 of housing 26 a short vertical strap 68. Side wall 56 is bent vertically downwardly at 70, and the lower vertically disposed portion 71 thereof is bolted to the straps 68 at each end as at 72. Rear wall 58 has a vertical dimension substantially less than front wall 56 and along its lower edge is provided with a double flange 74 which rests upon a pair of reinforcement blocks 76 welded respectively to the inner faces of plate 20 and side wall 28. The space between the flange 70 of rear wall 58 and the adjacent inclined portion of front wall 56 defines a longitudinally extending discharge outlet 78.

Referring now to Fig. 3, it will be noted that within housing 26, there is arranged a bearing 80; and plate 20 at the opposite end of the machine has a bearing 82 mounted thereon which is aligned axially with bearing 80. In these bearings, there is journalled a shaft 84. At one end, shaft 84 has a drive pulley 86 mounted thereon which is adapted to be driven by a belt 88 from a motor, not shown. At its opposite end within housing 26, there is mounted on shaft 84 an impeller having radial arms 90 provided with blades 92 at the outer end thereof. Between wall 26 and plate 20, shaft 84 has a series of four hubs 94 fixed thereto. These hubs support semi-cylindrical plates 96 which are retained on the hubs by means of semi-circular straps 98. The details of this arrangement are shown in Fig. 4. Straps 98 are fashioned with radial lugs 100 at the opposite ends thereof through which bolts 102 are passed for tightly clamping the straps 98 around the semi-cylindrical plates 96. Adjacent the end of each plate 96, there is welded to the outer face thereof a stud 104 which is arranged to pass through an opening 106 in each plate 96. A nut 108 is employed for retaining straps 98 on the respective plates 96. Thus, in assembling the machine, straps 98 are first mounted on the ends of semi-cylindrical plates 96 by means of the studs 104 and nuts 108; and thereafter, the semi-cylindrical plates are mounted on the hubs 94 and secured thereto by the bolts 102. A set screw 110 is employed for locking the hubs 94 on shaft 84. Four plates 96 are utilized in the arrangement in order to facilitate the assembly thereof. More specifically, hopper 46 is provided with a side wall 112 (Figs. 3 and 5), the lower edge of which defines a semi-circular opening 114 through which the plates 96 at the drive end of the machine extend. In assembling the machine, the two plates 96 adjacent the drive end of the machine within hopper 46 are first mounted on their respective hubs 94 and then the other two plates 96 are mounted on their respective hubs. Plates 96 have a series of short lugs 116 and longer lugs 118 mounted thereon and projecting radially outwardly. The function of these lugs will be described hereinafter.

Around the cylinder formed by plates 96, there is arranged a cylindrical screen comprising an upper section 120 and two lower sections 122 and 124. These screens are semi-cylindrical in shape and are fashioned with flanged edges 126 so that they may be secured together along these edges by bolts 128. The ends of top screen 120 and bottom screen 122 adjacent the blower housing 26 are fitted around a circular strap 130 welded to the wall 28 of housing 26. At its opposite end, screen 120 is seated on a semi-circular strap 132 welded to the wall 112 of hopper 46 around the opening 114. The other lower screen section 124 is fitted at one end around a semi-circular strap 136 on the end plate 20. If desired, angle iron lugs 138 may be welded to wall 28 and plate 20, respectively, for temporarily holding the sections 122 and 124 until they are secured in assembled relation. At their adjacent ends, screen sections 122 and 124 are provided with angle iron lugs 140 which are secured together as by bolts 142. It will be observed that the flanged edge portion 126 of screen 124 is bolted as at 143 to the base plate 145 of hopper 46 (Fig. 5).

Referring now to Figs. 2 and 3, it will be observed that wall 28 of housing 26 is provided with an opening 144, the top portion of which is circular in shape and concentric and of approximately the same size as the cylinder formed by screens 120 and 122. The lower portion of this opening 144 is closed by a plate 146 that is welded to wall 28 on the inside of blower housing 26. Bearing 80 is mounted on plate 146. A strap 148 on wall 28 is arranged for clamping a sliding door 150 in a desired position of adjustment for controlling the effective size of opening 144. Door 150 slides behind strap 148 and strap 130, the latter being slotted to accommodate door 150.

Blower housing 26 has at the upper end thereof a peripheral outlet opening 152 from which a conveyor chute 154 extends. The outer wall 30 of housing 26 is provided with an inlet opening 156 in axial alignment with the axis of rotation of the impeller in housing 26. A suction pipe 158 connects with opening 156. Suction pipe 158 includes a plurality of sections including a curved section 160 extending upwardly from opening 156 and towards the rear of the machine, a generally horizontally disposed short section 162 and a downwardly curved section 164 at the rear of the machine which connects with an aspirator casing 166. Aspirator casing 166 is fashioned with outwardly and downwardly flaring side walls 168 and 170 and front and back walls 172 and 174, respectively. The lower end of aspirator 166 is connected with the frame of the machine by bolts 169 extending through the lower portions of side walls 168 and 170. At one side of the machine, these bolts extend through the end wall 28 of blower housing 26 and at the other end of the machine, these bolts extend through plate 20. The front wall 172 is formed with a double flange 176 along the lower edge thereof which, in the assembled condition, is disposed along the top side of the double flange 74 of the rear wall 58 of the corn sheller housing. Rear wall 174 of aspirator casing 166 is bent adjacent its lower edge along an upwardly inclined line 178. Break line 178 inclines upwardly from the drive end to the blower end of the machine. Comparing Figs. 2 and 5, it will be observed that the back wall 174 of aspirator casing 166 also inclines toward front wall 172 in a direction from the drive end of the machine to the blower end of the machine. The vertically disposed lower portion 180 of rear wall 174 cooperates with the vertically disposed portions 71 of front wall 56 of the sheller housing to form an aspirator inlet opening 182 of tapered configuration, the inlet 182 being widest adjacent plate 20 and tapering down to a narrow end adjacent side wall 28 of blower housing 26. Thus, aspirator casing 166 is of progressively narrower cross section in a direction from the drive end of the machine towards the blower housing.

In operation, the machine is designed to be supported on a floor structure provided with an elongated opening 186 positioned below the aspirator inlet 182. Below the opening 186 in floor 184, a conveying mechanism such as a belt 188 is arranged to travel. The shelled corn that drops through opening 182 is carried by belt 188 to a storage bin. Screens 190 and 192 are arranged adjacent the opposite edges of opening 186 to deflect onto belt 188 kernels of corn which would otherwise tend to scatter. The corn which is to be shelled is fed into the machine in the as picked condition through hopper 46. The cob corn which is fed into the machine through hopper 46 gradually travels from hopper 46 longitudinally through the cylindrical screens 120, 122 and 124 to the opening 144 in the wall 28 of housing 26. As the cylinder formed by plates 96 rotates rapidly, the cobs of corn are agitated and caused to rub against one another by reason of the lugs 116 and 118. This tends to remove the husks and the kernels from the corn cobs. The openings in the screens 120, 122 and 124 are sufficiently large to pass the kernels of corn; and thus, the kernels fall through the screen together with other small debris, such as particles of husks, dirt, etc., that might be mixed with the corn. The mass of cobs are advanced axially towards the opening 144 by reason of the head of cob corn fed into hopper 46; and by the time the cobs reach the opening 144, the kernels are completely removed therefrom. If it appears that the cobs should remain within the sheller a longer period of time, strap 148 is loosened and door 150 is lowered to restrict the effective size of opening 144 and thus prevent the corn cobs from being discharged as readily into blower housing 26. As the cobs are discharged into blower housing 26, they are picked up by the impellers 92 and by the high velocity air stream flowing upwardly through outlet 152 and are conveyed by this high velocity air stream through conveyor chute 154 to a cob bin or the like.

The kernels of corn and other particles previously referred to that pass through screens 120, 122 and 124 drop into the chamber formed by the front and rear walls 56 and 58, respectively, of the corn sheller housing. These kernels, dirt, etc. pass downwardly through the outlet 78 of this housing and into the aspirator 166. In the arrangement shown, it will be understood that the quantity of kernels passing through the screens is greatest adjacent the hopper 46 and diminishes in a direction towards the outlet opening 144. Thus, the tapered shape of aspirator 166 and particularly at the opening 182 thereof accommodates for this difference in the quantity of corn discharged through outlets 78 at the opposite ends of the machine. The blower arrangement described is of the type wherein a high suction is produced in the suction pipe 158; and therefore, a high velocity air stream flows into the aspirator 166 through the inlet opening 182 thereof. Thus, as the corn is discharged through outlet 78 into the aspirator 166, it has to fall through an upwardly moving high velocity air stream. The suction in aspirator 166 is adjusted as by means of a damper 194 so that the velocity of this air stream is sufficient to pick up particles of dirt, husks, cobs, etc., from the shelled corn while permitting the kernels of corn to drop downwardly through the opening 182 onto belt 188. Thus, the volume of air along the length of aspirator 166 varies generally in proportion to the quantity of corn being discharged along opening 78.

This particular arrangement is highly desirable for several reasons. In the first place, the discharge outlet for the shelled corn is spread out over a relatively wide area, thus facilitating the separation of dirt, corn husks, etc. from the kernels of corn. In addition, the aspirator is designed so that the volume of air caused to travel past the discharge outlet of the corn sheller varies generally in accordance with the variation in the amount of corn discharged from this outlet along the length of the machine. In practice, it has been discovered that these two features cooperate to produce a very clean mass of corn on belt 188.

Various features of the present construction also account for the fact that the machine has a relatively high output capacity for its size. By mounting bearing 80 on wall 28 of housing 26, the air inlet 156 of the blower can be arranged at the axial center of the blower. Then by arranging the suction pipe 158 so that it connects with housing 26 at the axial center of the impeller within the housing, a maximum velocity of air is caused to flow for any given size blower. This enhances the cleaning effect at the inlet 182 of the aspirator and at the same time assists in conveying the cobs and other debris to the point of discharge through pipe 154. Furthermore, it will be observed that suction pipe 158 and aspirator 166 are designed to prevent the material being discharged from accumulating as a mass in suction pipe 158 and aspirator 166. Adjacent the inlet 182, the aspirator 166 extends generally vertically upwardly; and except for the short horizontally disposed section 162 of suction pipe 158, the material being conveyed to the inlet 156 of housing 26 is either traveling an upward or a downward path. Clogging of the system and restriction of the air passageways is thus reduced to a minimum.

From the standpoint of construction, the machine is designed to achieve a further advantage. Assembly of the machine is facilitated by reason of the fact that the two ends of the machine, namely, the end frame 18 and the blower section 12 can be bolted to the sheller housing and hopper portion of the machine. Furthermore, it will be observed that the blower section 12 can be readily removed from the remainder of the machine; and this enables the mounting of a different size blower on a single size of corn sheller body.

I claim:

1. A corn sheller comprising means defining a corn sheller housing, means within said housing forming a generally cylindrical perforate chamber, a blower housing at one end of said corn sheller housing, said blower housing having a side wall disposed adjacent one end of said cylindrical chamber, said last mentioned wall having an opening therein communicating with said cylindrical chamber at said end thereof, a rotating shaft extending axially through said cylindrical chamber and projecting through said side wall into said blower housing, said side wall of said blower housing having a bearing thereon in which said shaft is journalled, the portion of said shaft within said blower housing having an impeller mounted thereon, said blower housing having an opposite side wall, said impeller being disposed between said side walls of the housing, said opposite side wall having an air inlet opening aligned concentrically with said shaft, the portion of said shaft within said cylindrical chamber having an agitating device thereon, said sheller housing having a discharge outlet at the lower end thereof through which kernels of corn passing through the wall of said cylindrical chamber are adapted to be discharged and an aspirator conduit extending substantially directly from the inlet opening of said blower housing to said discharge outlet of said corn sheller housing.

2. A corn sheller comprising a horizontally disposed cylinder formed of a foraminous material, said cylinder having an inlet for cob corn at one end and an outlet for cobs at its opposite end, a toothed member journalled for rotation in said cylinder and adapted when rotated to cause a separation of the kernels from the cobs, a housing surrounding said cylinder and having opposed longitudinally extending side walls which extend downwardly to a level substantially below said cylinder, said side walls tapering inwardly and downwardly toward each other and being spaced apart along their lower edges to define a discharge outlet for said housing in the form of a slot extending longitudinally of said cylinder and substantially co-extensive therewith, and means forming an air aspirator conduit intersecting and flowing past said discharge outlet, said aspirator conduit at said intersection being co-extensive in length with said discharge outlet and being of progressively decreasing width in a direction toward the outlet of the cylinder.

3. A corn sheller as called for in claim 2 wherein said discharge outlet is of relatively small width so that the material discharged therefrom into said aspirator conduit is confined as a relatively narrow stream.

4. A corn sheller as called for in claim 3 wherein said aspirator conduit terminates in an air inlet disposed adjacent and below said discharge outlet and means disposed directly below said aspirator conduit for gravitationally receiving the kernels of corn.

5. A corn sheller comprising means defining a corn sheller housing, means within said housing forming a generally cylindrical perforate chamber, a blower housing at one end of said corn sheller housing, said blower housing having a side wall disposed adjacent one end of said cylindrical chamber, said last mentioned wall having an opening therein communicating with said cylindrical chamber at said end thereof, a rotating shaft extending axially through said cylindrical chamber and projecting through said side wall into said blower housing, the portion of said shaft within said blower housing having an impeller mounted thereon, said blower housing having an opposite side wall, said impeller being disposed between said side walls of the housing, said opposite side wall having an air inlet opening aligned generally concentrically with said shaft, the portion of said shaft within said cylindrical chamber having an agitating device thereon, said sheller housing having a discharge outlet at the lower end thereof through which kernels of corn passing through the wall of said cylindrical chamber are adapted to be discharged and an aspirator conduit extending substantially directly from the inlet opening of said blower housing to said discharge outlet of said corn sheller housing.

6. A corn sheller as called for in claim 5 wherein said discharge outlet on said corn sheller housing is substantially co-extensive in length with said generally cylindrical perforate chamber.

7. A corn sheller as called for in claim 6 wherein the end of the aspirator conduit adjacent said discharge outlet is provided with an air inlet opening substantially co-extensive in length with said discharge outlet of the corn sheller housing.

8. A corn sheller comprising means defining a corn sheller housing, means within the housing forming a generally cylindrical perforate chamber, a blower housing at one end of the corn sheller housing, said blower housing having a pair of spaced apart side walls, one of said side walls being disposed adjacent one end of the cylindrical chamber, said last mentioned side wall having an opening therein adjacent the center of the blower communicating with said cylindrical chamber, a rotating shaft extending axially through the cylindrical chamber and projecting through said last mentioned side wall into the blower housing, the portion of the shaft within the blower housing having an impeller mounted thereon and the portion of the shaft extending axially through said cylindrical chamber having an agitating device thereon, said corn sheller housing having a discharge outlet at the lower end thereof through which kernels of corn passing through the wall of the cylindrical chamber are adapted to be discharged, the other side wall of said blower housing also having an opening adjacent the axial center of the blower and an aspirator conduit extending substantially directly from said last mentioned opening in the blower housing to said discharge outlet of the corn sheller housing.

9. A corn sheller comprising a horizontally disposed cylindrical screen, said screen having an inlet at one end and an outlet at its other end, a hopper at said inlet, a blower having a housing connected with said outlet and an impeller in said blower housing, rotating means within said screen for causing separation of the kernels from the cobs of corn fed into said screen whereby said kernels, pieces of husks and other small particles within the cylindrical screen are adapted to pass through the screen, a housing surrounding said cylindrical screen and having inwardly and downwardly tapering side walls, said side walls being generally co-extensive in length with said cylindrical screen, said side walls terminating in a discharge opening at the lower end of said housing which is substantially co-extensive in length with said cylindrical screen and an aspirator conduit extending directly from said discharge opening at the lower end of said last mentioned housing to the inlet of said blower, said aspirator conduit being open at said discharge opening and said blower and being otherwise substantially closed, said aspirator conduit having its inlet substantially co-extensive in length with the discharge opening of said last mentioned housing and disposed adjacent said discharge opening, the inlet of said aspirator conduit comprising a downwardly opening pipe section, said discharge opening of said housing intersecting said aspirator conduit above the lower edge of said downwardly opening pipe section, said downwardly opening pipe section being of tapered cross section in a horizontal plane, being narrow at the end thereof adjacent said blower housing and being wider at the end thereof adjacent said hopper.

10. A corn sheller as called for in claim 9 wherein the portion of said aspirator conduit adjacent said pipe section tapers in cross section, being narrower at the end thereof adjacent said blower housing and wider at the end thereof adjacent said hopper.

11. A corn sheller comprising means defining a corn sheller housing, means within the housing forming a generally cylindrical perforate chamber, a blower housing at one end of the corn sheller housing, said blower housing having a pair of spaced apart side walls, one of said side walls being disposed adjacent one end of the cylindrical chamber, said last mentioned side wall having an opening therein adjacent but spaced from the center of the blower and communicating with the cylindrical chamber, said last mentioned wall having a bearing thereon aligned axially with the center of the blower, a rotating shaft extending axially through the cylindrical chamber, projecting through said last mentioned wall and journalled in said bearing, the portion of the shaft within the blower housing having an impeller mounted thereon and the portion of the shaft extending axially through said cylindrical chamber having an agitating device thereon, said corn sheller housing having a discharge outlet at the lower end thereof through which kernels of corn passing through the wall of the cylindrical chamber are adapted to be discharged, the other side wall of said blower housing also having an opening therein, said last mentioned opening being located such that the axis of the blower passes therethrough and an aspirator conduit extending substantially directly from said last mentioned opening in the blower housing to said discharge outlet of the corn sheller housing.

References Cited in the file of this patent

UNITED STATES PATENTS

| | | |
|---|---|---|
| 565,926 | Rowe | Aug. 18, 1896 |
| 2,443,031 | Gerber | June 8, 1948 |
| 2,754,827 | McCreery | July 17, 1956 |
| 2,849,004 | McCreery et al. | Aug. 26, 1958 |

FOREIGN PATENTS

| | | |
|---|---|---|
| 353,626 | Great Britain | July 30, 1931 |
| 701,169 | Great Britain | Dec. 16, 1953 |